United States Patent
Mandelli et al.

(10) Patent No.: US 11,856,305 B2
(45) Date of Patent: Dec. 26, 2023

(54) HARDWARE IMPLEMENTATION OF SENSOR ARCHITECTURE WITH MULTIPLE POWER STATES

(71) Applicant: APPLE INC., Cupertino, CA (US)

(72) Inventors: Emanuele Mandelli, Mountain View, CA (US); Walter Nistico, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/401,385

(22) Filed: Aug. 13, 2021

(65) Prior Publication Data

US 2021/0377465 A1  Dec. 2, 2021

Related U.S. Application Data

(63) Continuation of application No. PCT/US2020/023777, filed on Mar. 20, 2020.

(60) Provisional application No. 62/824,500, filed on Mar. 27, 2019.

(51) Int. Cl.
*H04N 25/42* (2023.01)
*H04N 25/44* (2023.01)
*H04N 25/70* (2023.01)

(52) U.S. Cl.
CPC ............ *H04N 25/42* (2023.01); *H04N 25/44* (2023.01); *H04N 25/70* (2023.01)

(58) Field of Classification Search
None
See application file for complete search history.

(56) References Cited

U.S. PATENT DOCUMENTS

| | | |
|---|---|---|
| 9,503,641 B2 | 11/2016 | Likamwa et al. |
| 9,509,910 B2 | 11/2016 | Skogo |
| 9,521,349 B2 | 12/2016 | Vogelsang et al. |

(Continued)

FOREIGN PATENT DOCUMENTS

| | | |
|---|---|---|
| EP | 2804074 A2 | 11/2014 |
| KR | 10-2011-0025673 A | 3/2011 |

(Continued)

OTHER PUBLICATIONS

European Patent Office (ISA/EP), International Search Report and Written Opinion of the International Searching Authority, International Application No. PCT/US2020/023750, 11 pages, dated May 18, 2020.

(Continued)

*Primary Examiner* — Quan Pham
(74) *Attorney, Agent, or Firm* — Thompson Hine LLP

(57) ABSTRACT

In one implementation, an event sensor includes a plurality of pixels and an event compiler. The plurality of pixels are positioned to receive light from a scene disposed within a field of view of the event sensor. Each pixel is configured to have an operational state that is modified by control signals generated by a respective state circuit. The event compiler is configured to output a stream of pixel events. Each respective pixel event corresponds to a breach of a comparator threshold related to an intensity of incident illumination. Each control signal is generated based on feedback information that is received from an image pipeline configured to consume image data derived from the stream of pixel events.

19 Claims, 6 Drawing Sheets

(56) References Cited

U.S. PATENT DOCUMENTS

| | | | |
|---|---|---|---|
| 9,762,829 | B2 | 9/2017 | Choi |
| 10,295,669 | B2 | 5/2019 | Deane |
| 10,395,376 | B2 | 8/2019 | Fu |
| 10,516,838 | B2 | 12/2019 | Suh |
| 10,531,031 | B2 | 1/2020 | Park |
| 10,645,323 | B2 | 5/2020 | Takahashi |
| 10,845,601 | B1 | 11/2020 | Meier |
| 10,863,098 | B2 | 12/2020 | Priyantha |
| 11,509,840 | B2 | 11/2022 | Wakabayashi |
| 2002/0044211 | A1* | 4/2002 | Tujii ............... H04N 5/3698 348/372 |
| 2014/0192206 | A1 | 7/2014 | Holz |
| 2014/0232932 | A1 | 8/2014 | LiKamWa |
| 2014/0313387 | A1 | 10/2014 | Vogelsang |
| 2014/0320688 | A1* | 10/2014 | Skogo ............... G06F 1/325 348/222.1 |
| 2014/0375820 | A1 | 12/2014 | Priyantha |
| 2015/0070544 | A1 | 3/2015 | Smith |
| 2015/0373290 | A1 | 12/2015 | Vogelsang |
| 2016/0037110 | A1 | 2/2016 | Choi et al. |
| 2018/0077374 | A1* | 3/2018 | Takahashi ......... H04N 5/3454 |
| 2018/0143701 | A1* | 5/2018 | Suh ................. H04N 25/709 |
| 2018/0167570 | A1 | 6/2018 | Suh et al. |
| 2018/0231660 | A1 | 8/2018 | Deane |
| 2018/0262705 | A1 | 9/2018 | Park et al. |
| 2019/0026901 | A1 | 1/2019 | Fu et al. |
| 2021/0152757 | A1* | 5/2021 | Wakabayashi ..... H04N 5/23218 |

FOREIGN PATENT DOCUMENTS

| | | | |
|---|---|---|---|
| KR | 20110025673 A * | 3/2011 | |
| KR | 10-2012-0062034 A | 6/2012 | |
| KR | 10-2017-0027107 A | 3/2017 | |
| KR | 20170027107 A * | 3/2017 | |
| KR | 10-2018-0068720 A | 6/2018 | |
| KR | 20180068720 A * | 6/2018 | |
| WO | 2020/197956 A1 | 10/2020 | |
| WO | 2020/197972 A1 | 10/2020 | |

OTHER PUBLICATIONS

European Patent Office (ISA/EP), International Search Report and Written Opinion of the International Searching Authority, International Application No. PCT/US2020/023777, 15 pages, dated Aug. 31, 2020.

Belenky, A. et al., "A Snapshot CMOS Image Sensor with Extended Dynamic Range," IEEE Sensors Journal, vol. 9, No. 2, pp. 103-111, Feb. 2009.

Moyes, D.P. et al., "A Sensitive Dynamic and Active Pixel Vision Sensor for Color or Neural Imaging Applications," IEEE Transactions on Biomedical Circuits and Systems, 14 pages, Nov. 2017.

Choi, J. et al., "A Spatial-Temporal Multiresolution CMOS Image Sensor with Adaptive Frame Rates for Tracking the Moving Objects in Region-of-Interest and Suppressing Motion Blur," IEEE Journal of Solid-State Circuits, vol. 42, No. 12, pp. 2978-2989, Dec. 2007.

European Patent Office, Communication Pursuant to Article 94(3) EPC, European Patent Application No. 20719019.0, 5 pages, dated Mar. 31, 2023.

Korean Intellectual Property Office, Notice of Allowance dated Sep. 13, 2023 which pertains to Korean Patent Application 10-2021-70306658. 5 pages.

U.S. Patent and Trademark Office, Notice of Allowance, U.S. Appl. No. 17/400,502, 13 pages, dated Sep. 22, 2023.

* cited by examiner

HARDWARE IMPLEMENTATION OF SENSOR ARCHITECTURE WITH MULTIPLE POWER STATES

CROSS REFERENCE TO RELATED APPLICATIONS

This application is related to International Application No. PCT/US2020/023750, filed Mar. 20, 2020, which is entitled "SENSOR SYSTEM ARCHITECTURE WITH FEEDBACK LOOP AND MULTIPLE POWER STATES", and incorporated herein by reference as if reproduced in its entirety

TECHNICAL FIELD

The present disclosure generally relates to the field of image processing, and in particular, to techniques for implementing sensors with a hardware architecture configured to support active, standby, and inactive operational states.

BACKGROUND

An event camera may include an image sensor that is referred to as a dynamic vision sensor ("DVS"), a silicon retina, an event-based sensor, or a frame-less sensor. Thus, the event camera generates (and transmits) data regarding changes in light intensity at each pixel sensor as opposed to data output by frame-based cameras regarding absolute light intensity at each pixel. Stated differently, while a frame-based camera will continue to generate (and transmit) data regarding absolute light intensity at each pixel when an illumination level of a scene disposed within its field of view remains static, an event camera will refrain from generating or transmitting data until a change in the illumination level is detected.

Some image processing operations utilize less than a full set of image data derived from pixel events output by an event driven sensor. Such image processing operations may improve computational efficiency by cropping the image data and process the cropped image data to conserve power and the like. However, pixels of an event driven sensor corresponding to the image data external to the cropped image data continue to operate, and thus continue to consume power. As such, it is desirable to address this inefficiency arising when image processing operations utilize less than a full set of image data derived from pixel events output by an event driven sensor.

SUMMARY

Various implementations disclosed herein relate to techniques for implementing event driven sensors with a hardware architecture configured to support active, standby, and inactive operational states. The plurality of pixels are positioned to receive light from a scene disposed within a field of view of the event sensor. Each pixel is configured to have an operational state that is modified by control signals generated by a respective state circuit. The event compiler is configured to output a stream of pixel events. Each respective pixel event corresponds to a breach of a comparator threshold related to an intensity of incident illumination. Each control signal is generated based on feedback information that is received from an image pipeline that is configured to consume image data derived from the stream of pixel events.

In another implementation, a pixel includes a photodetector circuit, an event circuit and a state circuit. The photodetector circuit is configured to generate pixel data indicative of an intensity of incident illumination. The event circuit is configured to generate event data when the pixel data indicates that the photodetector circuit has detected a change in light intensity that exceeds a comparator threshold. The state circuit is configured to transition the pixel between an active state and a standby state based on feedback information generated by an image pipeline that consumes image data derived using the event data.

In another implementation, a pixel includes a photodetector circuit, an event circuit and a state circuit. The photodetector circuit is configured to generate pixel data indicative of an intensity of incident illumination. The event circuit is configured to generate event data when the pixel data indicates that the photodetector circuit has detected a change in light intensity that breaches a comparator threshold. The state circuit is configured to generate control signals that modify an operational state of the pixel based on feedback information generated by an image pipeline that consumes image data derived using the event data.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
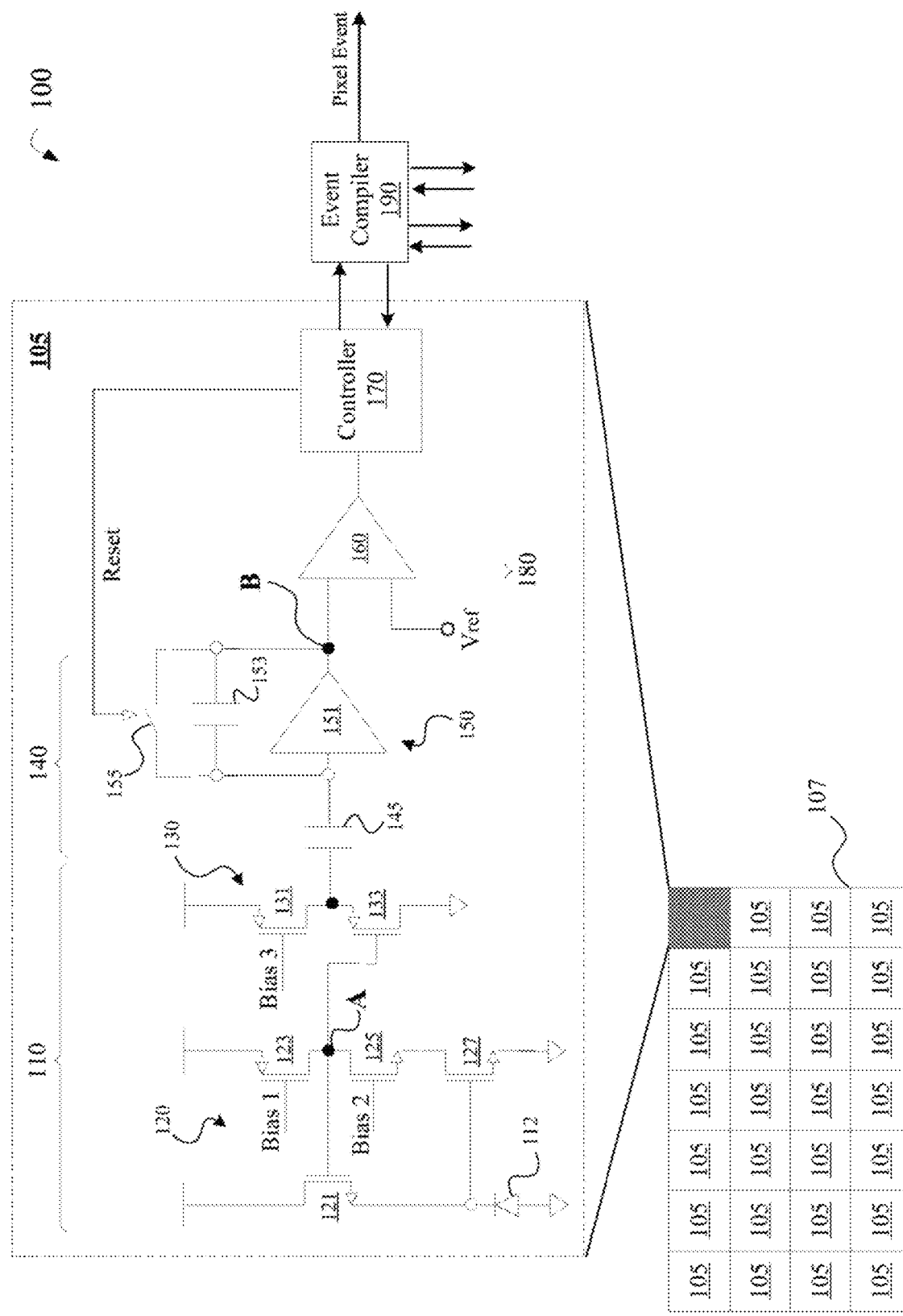
FIG. 1 illustrates a functional block diagram of an event sensor, in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

A functional block diagram of an example event sensor 100 is illustrated by FIG. 1. Event sensor 100 includes a plurality of pixels 105 positioned to receive light from a scene disposed within a field of view of event sensor 100. In FIG. 1, the plurality of pixels 105 are arranged in a matrix 107 of rows and columns and, thus, each of the plurality of pixels 105 is associated with a row value and a column value. Each of the plurality of pixels 105 include a photodetector circuit 110 and an event circuit 180.

Photodetector circuit 110 is configured to generate signals indicative of an intensity of light incident on a respective pixel 105 ("incident illumination"). To that end, photodetector circuit 110 includes a photodiode 112 configured to generate a photocurrent that is proportional to an intensity of incident illumination. The photocurrent generated by photodiode 112 flows into a logarithmic amplifier 120 formed by transistors 121, 123, 125, and 127. Logarithmic amplifier 120 is configured to convert the photocurrent into a voltage at node A with a value that is a logarithm of a value of the photocurrent. The voltage at node A is then amplified by a buffer amplifier 130 formed by transistors 131 and 133 before being applied to an input side of a differencing circuit 140 of event circuit 180.

Pixel 105 further includes an event circuit 180 comprising a differencing circuit 140, a comparator 160, and a controller 170. Differencing circuit 140 is composed of alternating current ("AC") coupling capacitor 145 and switched capacitor amplifier 150. Differencing circuit 140 is configured to remove a direct current ("DC") voltage component from the voltage at node A to produce pixel data at sampling node B. By removing the DC voltage component from the voltage at node A, the pixel data at sampling node B data provides a differential value of the intensity of incident illumination detected by photodiode 112. A gain provided by amplifier 151 corresponds to a ratio defined by the respective capacitive values of AC coupling capacitor 145 to capacitor 153. Reset switch 155 is activated (i.e., transitioned from an open state to a closed state) when a reset signal is received from controller 170. By activating reset switch 155, an operating point of amplifier 151 is reset to a reference voltage associated with a threshold value of comparator 160.

Comparator 160 is configured to provide pixel-level processing of pixel data received from sample node B. To that end, comparator 160 outputs an electrical response (e.g., a voltage) when the pixel data received from sample node B indicates that photodiode 112 detected a change in an intensity of incident illumination that breaches a threshold value. Alternatively, comparator 160 refrains from outputting an electrical response when the pixel data received from sample node B indicates that photodiode 112 did not detect a change in the intensity of incident illumination that breaches the threshold value.

In one implementation, comparator 160 is implemented using a plurality of comparators comprising a first comparator that is configured to output an electrical response indicative of positive events (e.g., events having a positive polarity) and a second comparator that is configured to output an electrical response indicative of negative events (e.g., events having a negative polarity). In one implementation, the first comparator outputs an electrical response when the pixel data received from sample node B indicates that photodiode 112 detected a change in the intensity of incident illumination that breaches a positive threshold value. In one implementation, the second comparator outputs an electrical response when the pixel data received from sample node B indicates that photodiode 112 detected a change in the intensity of incident illumination that breaches a negative threshold value.

Controller 170 is configured to coordinate with other components of the event sensor 100 (e.g., controllers within other pixels) to communicate an event signal (e.g., a sample of event data) to an event compiler 190 for each electrical response output by comparator 160. In one implementation, reset switch 155 receives a reset signal from controller 170 each time comparator 160 obtains pixel data at sampling node B that breaches the threshold value.

Event compiler 190 receives events signals (e.g., samples of event data) from each of the plurality of pixels 105 that each represent a change in an intensity of incident illumination breaching the threshold value. In response to receiving a sample of event data from a particular pixel of the plurality of pixels 105, event compiler 190 generates a pixel event. Furthermore, event compiler 190 populates the pixel event with information indicative of an electrical response (e.g., a value and/or polarity of the electrical response) included in the event signal. In one implementation, event compiler 190 also populates the pixel event with one or more of: timestamp information corresponding to a point in time at which the pixel event was generated and an address identifier corresponding to the particular pixel that sent the event signal which triggered the pixel event. A stream of pixel events including each pixel event generated by event compiler 190 may then be communicated to an image pipeline (e.g. image or video processing circuitry) (not shown) associated with event sensor 100 for further processing.

By way of example, the stream of pixel events generated by event compiler 190 can be accumulated or otherwise combined to produce image data. In some implementations the stream of pixel events is combined to provide an intensity reconstruction image. In this implementation, an intensity reconstruction image generator (not shown) may accumulate pixel events over time to reconstruct/estimate absolute intensity values. As additional pixel events are accumulated the intensity reconstruction image generator changes the corresponding values in the reconstruction image. In this way, it generates and maintains an updated image of values for all pixels of an image even though only some of the pixels may have received events recently.

Figure 2:
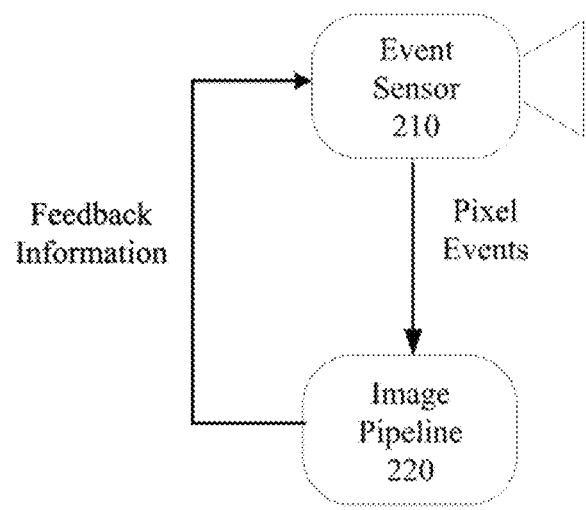
FIG. 2 is a block diagram of an example system for implementing event driven sensors with a hardware architecture configured to support active, standby, and inactive operational states.

In various implementations, event driven sensors are implemented with a hardware architecture configured to support active, standby, and operational states. Generally, this involves an event sensor 210 outputting pixel events to an image pipeline 220 and, in response, receiving feedback information from image pipeline 220, as seen in FIG. 2. Image pipeline 220 is configured to consume image data derived from the pixel events output by event sensor 210. To that end, image pipeline 220 includes one or more components, such as the intensity reconstruction image generator discussed above with respect to FIG. 1, to derive image data from the pixel events. The one or more components of image pipeline 220 may be implemented using various combinations of hardware components (e.g., application-specific integrated circuits, digital signal processors, and the like) and software components (e.g., noise reduction processes, image scaling processes, color space conversion processes, and the like).

In various implementations, image pipeline 220 effectuates some functionalities that utilize less than a full set of image data derived from the pixel events output by event sensor 210. By way of example, image pipeline 220 may further include a feature tracker configured to detect a feature depicted in the image data derived from the pixel events (e.g., using such techniques as SIFT, KAZE, and the like) and track that feature over time (e.g., using such techniques as a Kanade-Lucas-Tomasi tracker, a Shi-Tomasi tracker, and the like). In this example, the feature tracker of image pipeline 220 may effectuate an eye tracking functionality by detecting and tracking gaze characteristics (e.g., pupil center, pupil contour, glint locations, gaze direction, and the like) using image data depicting an eye of a user that is derived from pixel events output by event sensor 210.

Figure 3:
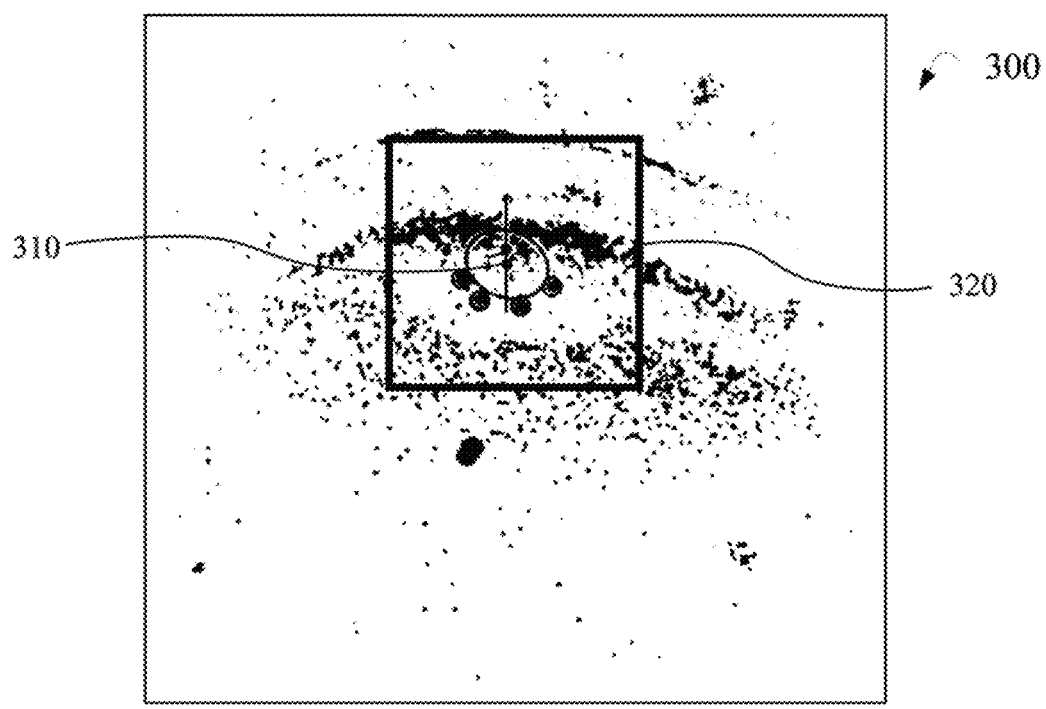
FIG. 3 illustrates an example of a full set of image data that an image pipeline derives from pixel events output by an event sensor.
Figure 4:
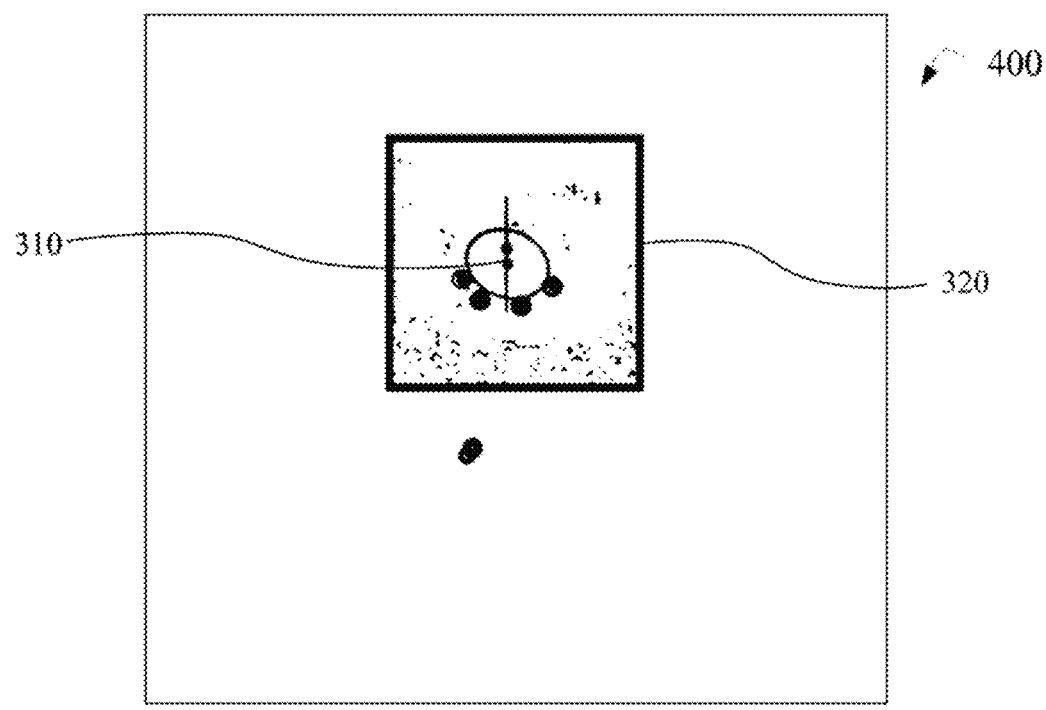
FIG. 4 illustrates an example of a cropped image data that an image pipeline derives from pixel events output by an event sensor.

FIG. 3 illustrates an example of a full set of image data 300 depicting an eye of a user that image pipeline 220 may derive from pixel events output by event sensor 210. To effectuate the eye tracking functionality, the feature tracker of image pipeline 220 has estimated a position of a pupil center ("estimated pupil center") 310 within the eye using a subset of image data 300 residing in a region of interest 320. Processing the full set of image data 300 to effectuate the eye tracking functionality may be computationally intensive for the feature tracker of image pipeline 220 and consume excessive power and computing resources. To improve computational efficiency and reduce power consumption, the feature tracker of image pipeline 220 may process the subset of image data residing in the region of interest 320. Image data residing outside of the region of interest 320 may be cropped to form cropped image data 400, as illustrated in FIG. 4.

One technique of cropping the image data residing outside of the region of interest 320 may be implemented using image pipeline 220. In accordance with this technique, image pipeline 220 may receive pixel events corresponding to a field of view of event sensor 210. To form the cropped image data 400, image pipeline 220 may either disregard pixel events corresponding to the image data residing outside of the region of interest 320 or crop the image data residing outside of the region of interest 320 after deriving the full set of image data 300. However, in either instance, event sensor 210 includes a subset of pixels generating the pixel events corresponding to the image data residing outside of the region of interest 320 that continue to consume power. Moreover, the pixel events corresponding to the image data residing outside of the region of interest 320 continue to consume bandwidth of a communication path between event sensor 210 and image pipeline 220. Accordingly, implementing a technique of cropping the image data residing outside of the region of interest 320 that involves event sensor 210 may further reduce power and bandwidth consumption.

To that end, image pipeline 220 communicates feedback information to event sensor 210, as illustrated in FIG. 2. In various implementations, such feedback information represents a feedback loop between an event sensor (e.g., event sensor 210) and an image pipeline (e.g., image pipeline 220). As discussed in greater detail below, an image pipeline consumes image data derived from pixel events output by the event sensor. Based on the image data, the image pipeline generates feedback information corresponding to a subset of the image data (e.g., a region of interest) that may be more useful to a particular image processing operation than other portions of the image data. That is, the feedback information corresponds to a subset of the image data on which processing is performed for a particular image processing operation. Responsive to the feedback information, an operational state of each pixel within a pixel array of the event sensor may be modified accordingly. In particular, different pixels within a pixel array of the event sensor may have different operational states based on the feedback information received from the image pipeline.

Figure 5:
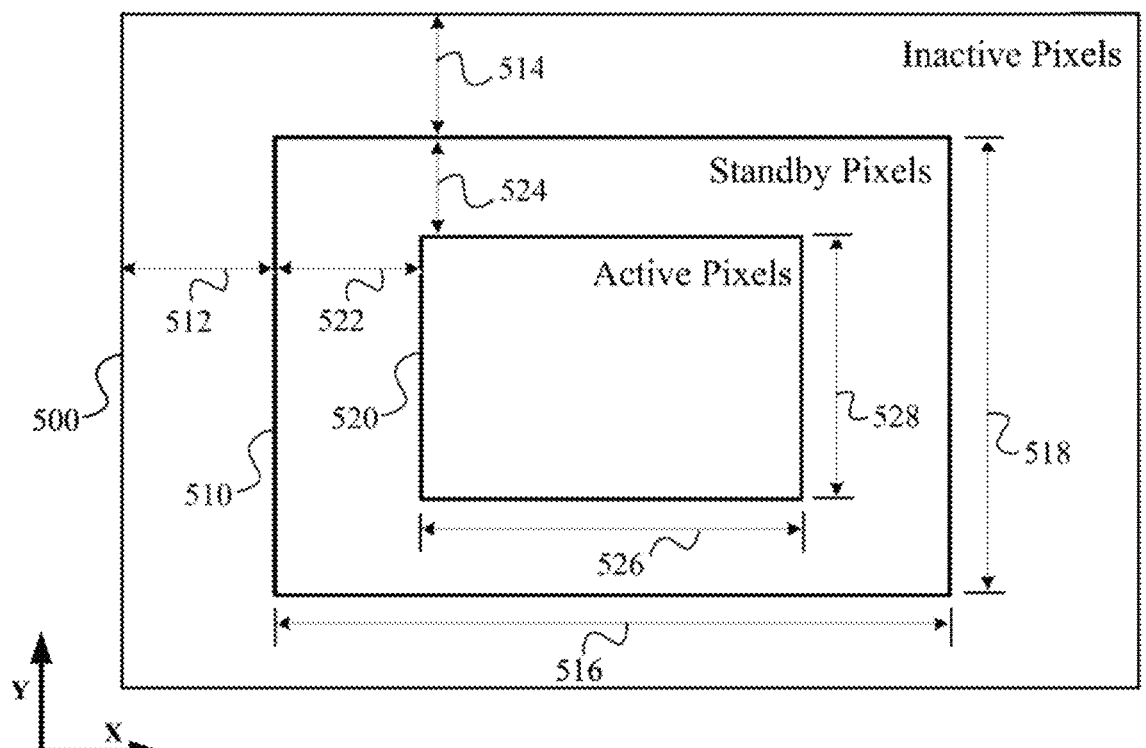
FIG. 5 illustrates an example of different pixels within a pixel array of an event sensor having different operational states based on feedback information received from an image pipeline.

FIG. 5 illustrates an example of a pixel array 500 of an event sensor with pixels configured to support different operational states. Pixel array 500 includes a plurality of pixels positioned to receive light from a scene disposed within a field of view of the event sensor. As such, when an operational state of each pixel among the plurality of pixels is an active state, image data derived from pixel events output by the event sensor generally depict a field of view of the event sensor. As used herein, "active state" refers to an operational state of a pixel in which a photodetector circuit and an event circuit of the pixel are each activated (or fully-functional).

When the event sensor receives feedback information from an image pipeline that less than a full set of image data is being processed by a particular image processing operation, some pixels of the event sensor may transition from the active state to another operational state. For example, some pixels of the event sensor may transition to an inactive state. As used herein, "inactive state" refers to an operational state of a pixel in which the pixel is less than fully-functional. In one implementation, a photodetector circuit and an event circuit of a pixel in an inactive state are each deactivated (or non-functional).

In some instances, a pixel of an event sensor may be unable to instantly transition from an inactive state to an active state. To mitigate such latency issues, some pixels of the event sensor may transition from the active state to a standby state. As used herein, "standby state" refers to an operational state of a pixel in which the pixel is less than fully-functional but is more functional than pixels in an inactive state. In one implementation, an event circuit of a pixel is deactivated (or non-functional) when the pixel transitions to a standby state while a photodetector circuit of the pixel is activated (or fully-functional).

By way of example, an image pipeline may communicate feedback information based on image data 300 of FIG. 3. In response to that feedback information, a first subset of pixels within region 520 of pixel array 500 are in an active state, a second subset of pixels within region 510 are in a standby state, and a third subset of pixels external to regions 510 and 520 are in an inactive state. In this example, the first subset of pixels within region 520 may be associated with the pixel events corresponding to the region of interest 320 of FIGS. 3 and 4.

In one implementation, the feedback information includes parameters that define a location of one or more regions within pixel array 500. For example, the parameters that define a location of region 510 may include offset values specified relative to boundaries of pixel array 500, such as x-offset 512, y-offset 514, or a combination thereof. As another example, the parameters that define a location of region 520 may include offset values specified relative to boundaries of pixel array 500, such as some combination of x-offset 512, x-offset 522, y-offset 514, and y-offset 524.

In one implementation, one or more regions of pixel array 500 have a predefined size. For example, region 510 may have a predefined size specified as width 516 and height 518. As another example, region 520 may have a predefined size specified as width 526 and height 528. In one implementation, the feedback information includes parameters that define a size of one or more regions within pixel array 500. For example, the parameters of the feedback information may define one or more of width 516, width 526, height 518, and height 528.

In one implementation, the feedback information may include a bitmask encoding a target operational state for each individual pixel. For example, the bitmask could represent a circular region of pixels being in active state while pixels external to the circular region (e.g., the rest of the pixels comprising an event sensor) are in ready or inactive states. One skilled in the art may appreciate that the bitmask mask can represent any arbitrarily shaped region or set of regions in the event sensor being set in one of the disclosed operational states, with the smallest such region being any individual pixel.

Figure 6:
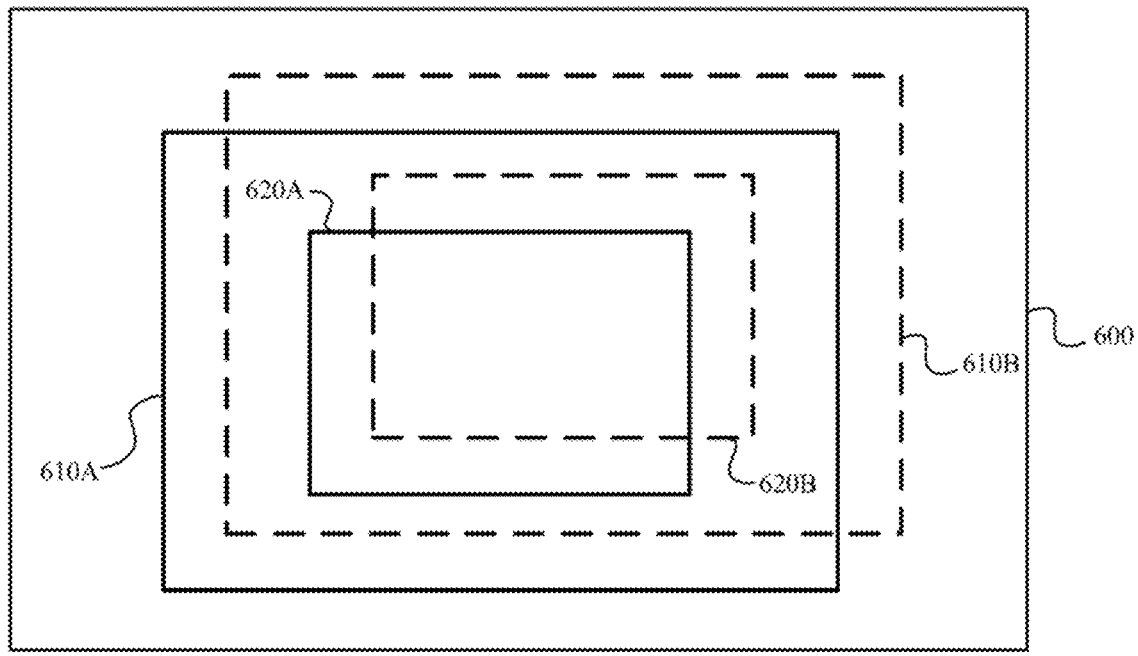
FIG. 6 illustrates an example of a pixel array with different pixels having different operational states modifying the operational states of some pixels as feedback information received from an image pipeline updates between a first time and a second time.

FIG. 6 illustrates an example of a pixel array 600 of an event sensor with different pixels having different operational states in which the operational states of some pixels are modified as feedback information received from an image pipeline updates between a first time and a second time. At the first time, an image pipeline may generate feedback information based on image data derived from pixel events output by the event sensor. In response to receiving the feedback information generated by the image pipeline at the first time, a first subset of pixels within region 620A of pixel array 600 are in an active state, a second subset of pixels within region 610A are in a standby state, and a third subset of pixels external to regions 610A and 620A are in an inactive state.

Subsequent to the first time, the image pipeline may receive additional pixel events from the event sensor that changes the image data being processed by the image pipeline. For example, a location of a feature of interest (e.g., pupil center 310 of FIG. 3) within the image data may change as the image data is updated by the additional pixel events. At a second time, the image pipeline may generate feedback information that accounts for that change in the image data arising from the additional pixel events. In response to receiving the feedback information generated by the image pipeline at the second time, a first subset of pixels within region 620B of pixel array 600 are in an active state, a second subset of pixels within region 610B are in a standby state, and a third subset of pixels external to regions 610B and 620B are in an inactive state.

Figure 7:
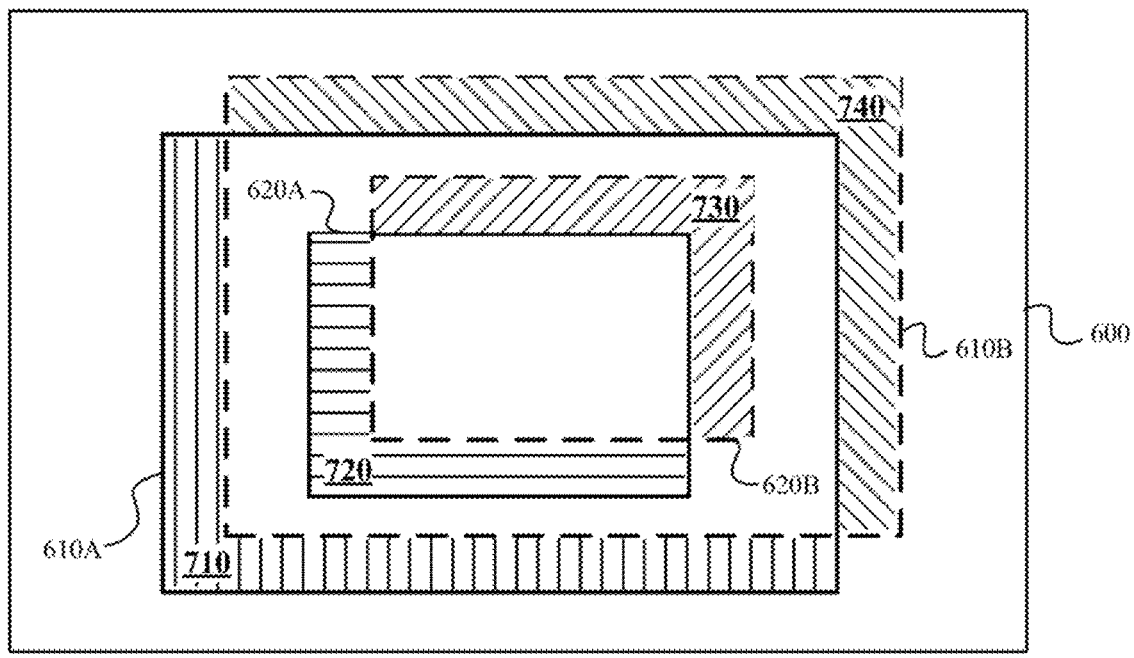
FIG. 7 illustrates subsets of pixels within the pixel array of FIG. 6 that transition from one operational state to another operational state as the feedback information received from the image pipeline updates between the first time and the second time.

Between the first time and the second time some pixels within pixel array 600 transition from one operational state to another operational state in response to the feedback information received from the image pipeline. For example, as seen in FIG. 7, pixels within sub-region 710 that were in the standby state at the first time would transition to the inactive state at the second time. Pixels within sub-region 720 of pixel array 600 that were in the active state at the first time would transition to the standby state at the second time. Similarly, pixels within sub-region 730 that were in the standby state at the first time would transition to the active state at the second time and pixels within sub-region 740 that were in the inactive state at the first time would transition to the standby state at the second time.

Figure 8:
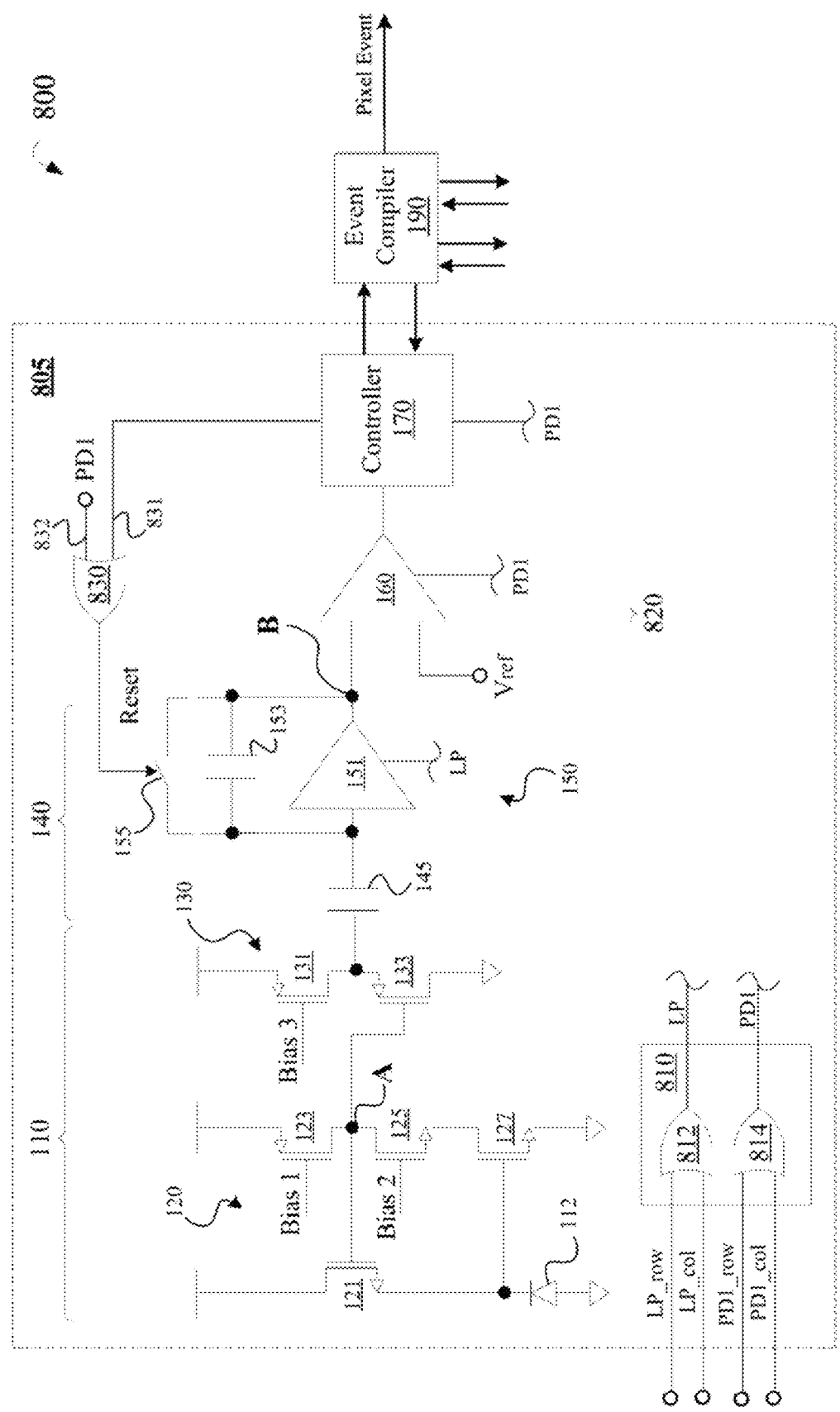
FIG. 8 is a circuit diagram for an example pixel with a hardware architecture that is configured to support active and standby operational states.

FIG. 8 is a circuit diagram for an example pixel 805 with a hardware architecture that is configured to support active and standby operational states. Similar to pixel 105 of FIG. 1, pixel 805 includes a photodetector circuit 110 configured to generate pixel data indicative of an intensity of incident illumination and an event circuit 820 configured to generate event data when the pixel data indicates that photodetector circuit 110 detected a change in light intensity that exceeds a comparator threshold of comparator 160. Unlike pixel 105, pixel 805 further includes a state circuit 810 configured to generate control signals that modify an operational state of pixel 805 based on feedback information generated by an image pipeline.

Among the control signals that state circuit 810 generates is a first control signal ("LP"). In one implementation, state circuit 810 generates the first control signal by performing a logical OR operation 812 on a signal received from an associated row controller ("LP_row") or a signal received from an associated column controller ("LP_col"). In one implementation, state circuit 810 generates the first control signal based on one or more signals received from the associated row controller, the associated column controller, or a combination thereof.

In operation, the first control signal is activated when an operational state of pixel 805 transitions to a standby state. Activating the first control signal minimizes a bias current of amplifier 151 within switch capacitor amplifier 150. In one implementation, minimizing the bias current of amplifier 151 maintains a virtual ground for AC coupling capacitor 145 within a target error margin (e.g., +/−5%). In one implementation, the bias current of amplifier 151 is returned to a "normal" value (e.g., a value corresponding to the bias current of amplifier 151 when an operational state of pixel 805 is an active state) prior to completing a transition of pixel 805 from the standby state to an active state. In one implementation, the bias current returns to the normal value prior to deactivating the first control signal. By returning the bias current of amplifier 151 prior to completing the transition from the standby state to the active state, the virtual ground for AC coupling capacitor may recover error that accumulated while pixel 805 is in the standby state. Returning the bias current of amplifier 151 prior to completing that transition may also prevent an erroneous triggering of comparator 160.

Another control signal that state circuit 810 generates is a second control signal ("PD1"). In one implementation, state circuit 810 generates the second control signal by performing a logical OR operation 814 on a signal received from an associated row controller ("PD1_row") or a signal received from an associated column controller ("PD1_col"). In one implementation, state circuit 810 generates the second control signal based on one or more signals received from the associated row controller, the associated column controller, or a combination thereof.

In operation, the second control signal is activated when an operational state of pixel 805 transitions to a standby state. Activating the second control signal deactivates comparator 160, controller 170, or a combination thereof within event circuit 820. In one implementation, deactivating controller 170 also bypasses capacitor 153 of switched capacitor amplifier 150. In one implementation, the second control signal that deactivates controller 170 is also passed to a first input 832 of a logical OR operation 830. Reset switch 155 receives a reset signal from the logical OR operation 830 when the second control signal is passed to the first input 832 of the logical OR operation 830. In bypassing capacitor 153 when controller 170 is deactivated, AC coupling capacitor 145 may continue to track variations of the intensity of incident illumination detected by photodetector circuit 110 while pixel 805 is in the standby state. Stated differently, AC coupling capacitor 145 is configured to track background changes in light intensity when the second control signal activates reset switch 155.

In one implementation, a second input 831 of the logical OR operation 830 receives signals from controller 170 when an operational state of pixel 805 is an active state. In one implementation, controller 170 is configured to output a signal to the second input 831 of the logical OR operation 830 when comparator 160 receives pixel data from sample node B that indicates photodiode 112 detected a change in an intensity of incident illumination that breaches a threshold value while pixel 805 is in the active state.

Figure 9:
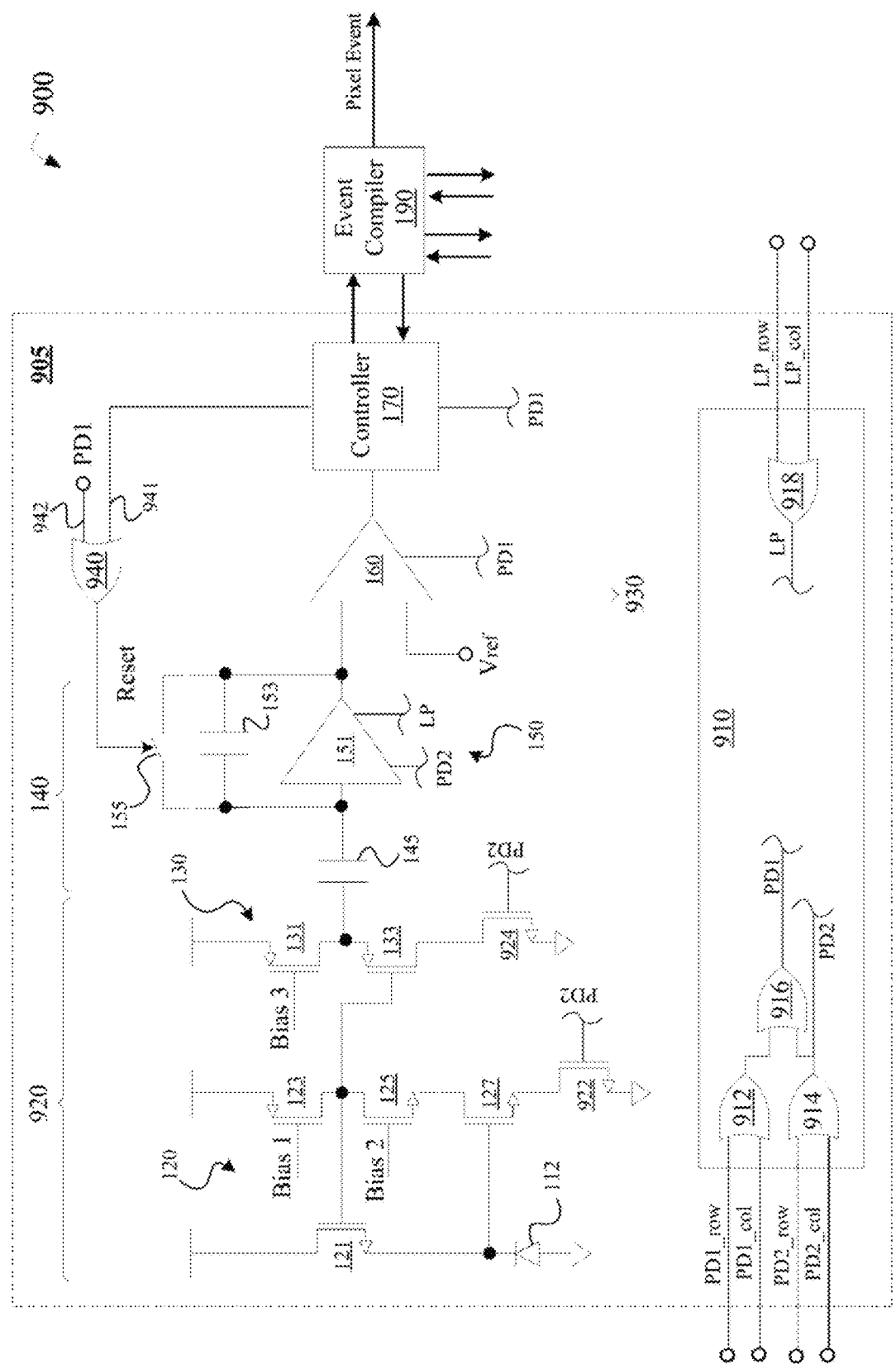
FIG. 9 is a circuit diagram for an example pixel with a hardware architecture that is configured to support active, standby, and inactive operational states.

FIG. 9 is a circuit diagram for an example pixel 905 with a hardware architecture that is configured to support active, standby, and inactive operational states. Similar to pixel 805, pixel 905 includes a state circuit 910 configured to generate control signals that modify an operational state of pixel 905 based on feedback information generated by an image pipeline. Like state circuit 810 of pixel 805, state circuit 910 also generates the first control signal ("LP") and the second control signal ("PD1").

In one implementation, generating the first control signal by state circuit 910 includes performing a logical OR operation 918 on a signal received from an associated row controller ("LP_row") or a signal received from an associated column controller ("LP_col"). In one implementation, activating the first control signal minimizes a bias current of amplifier 151 within switch capacitor amplifier 150. In one implementation, state circuit 910 generates the first control signal based on one or more signals received from the associated row controller, the associated column controller, or a combination thereof.

In one implementation, generating the second control signal by state circuit 910 includes performing a logical OR operation 912 on a signal received from an associated row controller ("PD1_row") or a signal received from an associated column controller ("PD1_col"). In one implementation, generating the second control signal by state circuit 910 includes performing a logical OR operation 916 on an output signal received from logical OR operation 912 or an output signal received from a logical OR operation 914. In one implementation, state circuit 910 generates the second control signal based on one or more signals received from the associated row controller, the associated column controller, or a combination thereof.

In pixel 905, controller 170 is deactivated when the second control signal is activated. In one implementation, as in pixel 805, deactivating controller 170 in pixel 905 also bypasses capacitor 153 of switched capacitor amplifier 150. Capacitor 153 is bypassed in pixel 905 when the second control signal that deactivates controller 170 is also passed to a first input 942 of a logical OR operation 940. Reset switch 155 receives a reset signal from the logical OR operation 940 when the second control signal is passed to the first input 942 of the logical OR operation 940.

In one implementation, a second input 941 of the logical OR operation 940 receives signals from controller 170 when an operational state of pixel 905 is an active state. In one implementation, controller 170 is configured to output a signal to the second input 941 of the logical OR operation 940 when comparator 160 receives pixel data from sample node B that indicates photodiode 112 detected a change in an intensity of incident illumination that breaches a threshold value while pixel 905 is in the active state.

Another control signal that state circuit 910 generates is a third control signal ("PD2"). In one implementation, state circuit 910 generates the third control signal by performing the logical OR operation 914 on a signal received from an associated row controller ("PD2_row") or a signal received from an associated column controller ("PD2_col"). In one implementation, state circuit 910 generates the third control signal based on one or more signals received from the associated row controller, the associated column controller, or a combination thereof.

In operation, the third control signal is activated when an operational state of pixel 905 transitions to an inactive state. Activating the third control signal deactivates at least a subset of photodetector circuit 920 by deactivating one or more of logarithmic amplifier 120 through activating a first power down switch 922 and buffer amplifier 130 through activating a second power down switch 924. In one implementation, activating the third control signal deactivates switched capacitor amplifier 150 by minimizing a bias current of amplifier 151.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. An event sensor comprising:
a plurality of pixels positioned to receive light from a scene disposed within a field of view of the event sensor, each pixel configured to have an operational state that is modified by control signals generated by a respective state circuit,
wherein each pixel comprises:
a photodetector circuit configured to generate pixel data indicative of an intensity of incident illumination;
an event circuit configured to generate event data when the pixel data indicates that the photodetector circuit detected a change in light intensity that exceeds a comparator threshold; and
a state circuit configured to transition the pixel between an active state, an inactive state, and a standby state, wherein:
in the active state, both the photodetector circuit and the event circuit are activated;
in the standby state, one of the photodetector circuit and the event circuit is deactivated and one of the photodetector circuit and the event circuit is activated; and
in the inactive state, both the photodetector circuit and the event circuit are deactivated; and
wherein, based on the control signals, pixels of the plurality of pixels in a first region are in the active state while pixels of the plurality of pixels in a second region surrounding the first region are in the standby state; and
an event compiler configured to output a stream of pixel events, each respective pixel event corresponding to a breach of a comparator threshold related to an intensity of incident illumination,
wherein each control signal is generated based on feedback information that is received from an image pipeline configured to consume image data derived from the stream of pixel events.

2. The event sensor of claim 1, wherein the event circuit includes a differencing circuit, a comparator, a controller, or a combination thereof.

3. The event sensor of claim 1, wherein the photodetector circuit includes a photodiode, a logarithmic amplifier, a buffer amplifier, or a combination thereof.

4. The event sensor of claim 1, wherein each state circuit generates the control signals based on signals received from an associated column controller, an associated row controller, or a combination thereof.

5. The event sensor of claim 1, wherein the feedback information corresponds to a region of interest within the image data that is tracked by a processing unit.

6. The event sensor of claim 1, wherein the control signals include a first control signal configured to deactivate a respective controller coupling a particular pixel to the event compiler.

7. The event sensor of claim 1, wherein the control signals include a second control signal configured to deactivate a respective photodetector circuit and a switched capacitor amplifier within a particular pixel.

8. The event sensor of claim 1, wherein the feedback information corresponds to a bitmask encoding a target operational state for each pixel among the plurality of pixels.

9. The method of claim 1, wherein, based on the control signals:
pixels of the plurality of pixels in a first region have an active state;
pixels of the plurality of pixels in a second region surrounding the first region have a standby state; and
pixels of the plurality of pixels in a third region surrounding the second region have an inactive state.

10. The method of claim 1, wherein, based on the control signals, the pixels of the plurality of pixels in the first region are in the active state while pixels of the plurality of pixels in the second region surrounding the first region are in the standby state and pixels of the plurality of pixels in a third region surrounding the second region are in the inactive state.

11. A pixel comprising:
a photodetector circuit configured to generate pixel data indicative of an intensity of incident illumination;
an event circuit configured to generate event data when the pixel data indicates that the photodetector circuit detected a change in light intensity that exceeds a comparator threshold; and
a state circuit configured to transition the pixel between an active state, an inactive state, and a standby state based on feedback information generated by an image pipeline that consumes image data derived using the event data, wherein:
in the active state, both the photodetector circuit and the event circuit are activated;
in the standby state, one of the photodetector circuit and the event circuit is deactivated and one of the photodetector circuit and the event circuit is activated; and
in the inactive state, both the photodetector circuit and the event circuit are deactivated,
wherein the pixel is one of a plurality of pixels of an event sensor, each of the plurality of pixels configured to have an operational state that is modified by control signals wherein, based on the control signals, pixels of the plurality of pixels in a first region are in the active state while pixels of the plurality of pixels in a second region surrounding the first region are in the standby state.

12. The pixel of claim 11, wherein the event circuit is deactivated when the pixel transitions from the active state to the standby state while the photodetector circuit remains operational.

13. The pixel of claim 11, wherein the event circuit includes a differencing circuit with a switched capacitor amplifier, and wherein a bias current of the switched capacitor amplifier is minimized when the pixel transitions from the active state to the standby state.

14. The pixel of claim 13, wherein a virtual ground for a capacitor intervening between the photodetector circuit and the switched capacitor amplifier is maintained within a target error margin when the bias current is minimized.

15. The pixel of claim 13, wherein the bias current is returned to a nominal value prior to completing a transition of the pixel between the standby state and the active state.

16. The pixel of claim 13, wherein deactivating a controller of the event circuit when the pixel transitions from the active state to the standby state also bypasses a feedback capacitor of the switched capacitor amplifier.

17. A pixel comprising:
a photodetector circuit configured to generate pixel data indicative of an intensity of incident illumination;
an event circuit configured to generate event data when the pixel data indicates that the photodetector circuit detected a change in light intensity that breaches a comparator threshold; and
a state circuit configured to generate control signals that modify an operational state of the pixel based on feedback information generated by an image pipeline that consumes image data derived using the event data, wherein the control signal transitions the operational state of the pixel to an active state, a standby state, or an inactive state, wherein,
in the inactive state, both a photodetector circuit and an event circuit of a respective pixel are deactivated,
in the standby state, one of the photodetector circuit and the event circuit is deactivated and one of the photodetector circuit and the event circuit is activated; and
in the inactive state, both the photodetector circuit and the event circuit are deactivated,
wherein the pixel is one of a plurality of pixels of an event sensor, each of the plurality of pixels configured to have an operational state that is modified by respective control signals, at least some of the control signals controlling a first subset of the plurality of pixels outside of a region of interest to provide less than fully functional event detection while a second subset of the plurality of pixels within the region of interest provides fully functional event detection, wherein, based on the control signals, pixels of the plurality of pixels in a first region are in the active state while pixels of the plurality of pixels in a second region surrounding the first region are in the standby state and pixels of the plurality of pixels in a third region surrounding the second region are in the inactive state.

18. The pixel of claim 17, wherein the control signals include a first control signal that transitions the operational state of the pixel to a standby state.

19. The pixel of claim 18, wherein the event circuit includes a coupling capacitor that is configured to track background changes in light intensity when the first control signal activates a switch of a switched capacitor amplifier within the event circuit.

* * * * *